Sept. 23, 1930.  H. D. BROWN  1,776,722
HIGH POWER FACTOR CIRCUIT FOR USE WITH COMPOUNDING
Filed Sept. 27, 1928
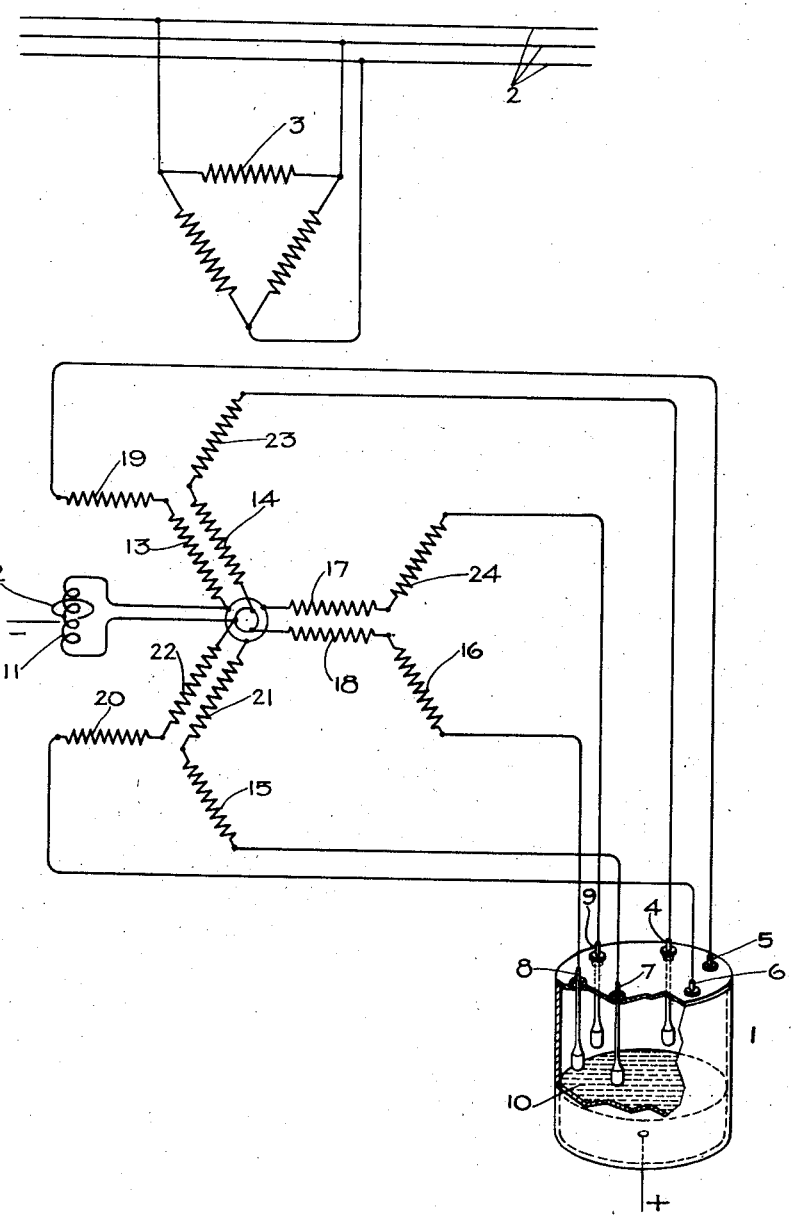
Inventor:
Herbert D. Brown,
by Charles E. Tullar
His Attorney.

Patented Sept. 23, 1930

1,776,722

UNITED STATES PATENT OFFICE

HERBERT D. BROWN, OF SCHENECTADY, NEW YORK, ASSIGNOR TO GENERAL ELECTRIC COMPANY, A CORPORATION OF NEW YORK

HIGH-POWER FACTOR CIRCUIT FOR USE WITH COMPOUNDING

Application filed September 27, 1928. Serial No. 308,728.

My invention relates to apparatus for transmitting power between direct and alternating current circuits and has for its principal object the provision of an improved arrangement whereby the voltage relation between the two circuits may be varied or regulated without producing undesirable changes in the power factor of the apparatus.

It is well known that power may be transmitted between alternating and direct current circuits through apparatus including a rectifier provided with a cathode and a plurality of anodes, and a transformer provided with groups of Y-connected windings arranged to have their neutral terminals interconnected through an interphase transformer and to have their end terminals interconnected with the anodes of the rectifier. The effect of the interphase transformer in such apparatus is to lengthen the period of time during which each anode transmits current thus smoothing out the direct current voltage and increasing the operating efficiency of the apparatus.

In order to prevent the decrease in the direct current voltage, which results from increase in rectifier load, it has been proposed to vary the saturation of the interphase transformer core in accordance with this load. This method of regulating the direct current circuit voltage, however, has not been altogether satisfactory for the reason that the power factor of the apparatus is decreased as the saturation of the interphase transformer core is increased due to increase in the leakage between the primary and secondary windings of the transformer. In accordance with my invention this decrease in power factor is minimized by arranging the secondary windings of the transformer in sections so coupled and interconnected as to greatly reduce the magnetic leakage which tends to occur between the primary and the secondary windings when the saturation of the interphase transformer core is increased and the period during which anode carries current is shortened.

My invention will be better understood from the following description when considered in connection with the accompanying drawing and its scope will be pointed out in the appended claims.

Referring to the drawing, the single figure thereof illustrates diagrammatically a rectifying apparatus arranged and interconnected in accordance with my invention.

This apparatus includes a mercury arc rectifier 1 connected to an alternating current source 2 through a transformer, the primary 3 of which is directly connected to this source. The secondary winding has six phases. Each phase is connected to one of the anodes 4, 5, 6, 7, 8 and 9 of the rectifier 1. The cathode 10 of the rectifier is connected to one side of the direct current circuit. The secondary windings are arranged in two Y-connected groups and an interphase transformer 11 is connected between the neutral points of the two groups. A coil 12 connected to the midpoint of transformer 11 and in series with the negative side of the direct current circuit is arranged to regulate the saturation of the core of transformer 11 in accordance with the load of the direct current circuit.

In order to reduce the magnetic leakage between the primary and secondary circuits of the transformer, the secondary windings are arranged in two Y-connected groups and each winding is made of two coils which are wound on different legs of the transformer core. Thus the coils 13 to 16 are wound on one leg of the core, the coils 17 to 20 are wound on another leg of the core, and the coils 21 to 24 are wound on still another leg of the core. Under these conditions, each anode is subjected to a voltage which is the resultant of the voltages induced in coils wound on different legs of the transformer core and the magnetic leakage produced between the primary and secondary circuits by saturation of the interphase transformer core is greatly reduced.

What I claim as new and desire to secure by Letters Patent of the United States, is:

1. The combination of a transformer provided with secondary windings arranged in Y-connected groups and each including coils wound on different core legs of said transformer and provided with end and neutral terminals, a rectifier provided with a plurality of anodes each connected to one of said end terminals and with a cathode, an interphase transformer winding connected between the neutral terminals of said groups, and means for controlling the saturation of said interphase transformer in accordance with the load of said rectifier.

2. The combination of a transformer provided with secondary windings arranged in Y-connected groups and each including coils wound on different core legs of said transformer and connected to form a symmetrical winding provided with end and neutral terminals, a rectifier provided with a plurality of anodes each connected to one of said end terminals and with a cathode, an interphase transformer winding connected between the neutral terminals of said groups, and a saturation coil connected to said interphase transformer at a point intermediate its ends.

In witness whereof, I have hereunto set my hand this 26th day of September, 1928.

HERBERT D. BROWN.